US00RE43213E

(19) United States
(12) Reissued Patent
Romay

(10) Patent Number: US RE43,213 E
(45) **Date of Reissued Patent: *Feb. 28, 2012**

(54) TOE SOCK

(75) Inventor: Joaquin Romay, San Diego, CA (US)

(73) Assignee: Injinji Footwear, Inc., San Diego, CA (US)

( * ) Notice: This patent is subject to a terminal disclaimer.

(21) Appl. No.: 12/220,701

(22) Filed: Jul. 2, 2008
(Under 37 CFR 1.47)

Related U.S. Patent Documents

Reissue of:
(64) Patent No.: 7,069,600
Issued: Jul. 4, 2006
Appl. No.: 10/772,766
Filed: Feb. 4, 2004

U.S. Applications:
(63) Continuation of application No. 10/158,780, filed on May 29, 2002, now Pat. No. 6,708,348, which is a continuation of application No. 09/863,153, filed on May 22, 2001, now abandoned.

(51) Int. Cl.
*A41B 11/00* (2006.01)

(52) U.S. Cl. ..... 2/239

(58) Field of Classification Search ..... 2/239, 240, 2/241, 242, 409; 66/178 R, 178 A, 182–187; 36/94, 98, 113, 117.3, 124, 7.7, 7.6, 59 R
See application file for complete search history.

(56) References Cited

U.S. PATENT DOCUMENTS 366,503 A * 7/1887 O'Neill ..... 36/140
482,095 A * 9/1892 McClurg ..... 66/187
715,543 A * 12/1902 Bosworth ..... 2/239
1,308,483 A * 7/1919 Craighead ..... 2/239
1,314,356 A * 8/1919 Norblad ..... 66/187
1,452,302 A * 4/1923 Loven ..... 2/239
1,772,179 A * 8/1930 Finkelstein ..... 602/30
1,798,201 A * 3/1931 Hedges ..... 2/239
2,219,235 A * 10/1940 Morton ..... 2/239
2,248,303 A * 7/1941 Morgenroth et al. ..... 2/239
2,422,736 A * 6/1947 Lambert ..... 2/241
2,424,056 A * 7/1947 Ruth ..... 2/241
2,629,996 A * 3/1953 Hamilton ..... 66/172 R
2,932,829 A * 4/1960 Corbin ..... 2/239
D189,206 S * 11/1960 Thompson ..... D2/994
3,013,564 A * 12/1961 Levey ..... 36/170
3,128,763 A * 4/1964 Langenfeld et al. ..... 128/894
3,760,425 A * 9/1973 Komatsu ..... 2/169
3,967,390 A * 7/1976 Anfruns ..... 36/94

(Continued)

*Primary Examiner* — Alissa L Hoey
(74) *Attorney, Agent, or Firm* — Procopio, Cory, Hargreaves & Savitch LLP

(57) ABSTRACT

An anatomic dry athletic toe sock includes a sock shaft section with a shaft support section to encircle a lower part of a leg of a wearer and to maintain the sock in proper orientation upon a wearer's leg, and a closed foot section adapted to receive the foot of the wearer. The closed foot section includes a heel section adapted to receive a heel of the wearer therein, an arch section having an arch support section to encircle the foot of the wearer in the arch of the wearer's foot and to prevent the arch section from moving relative to the wearer's foot, and a plurality of separated, closed toe sections to receive toes of the foot of the wearer. The toe sections are joined by nested, overlapping material portions. The sock is also made at least partially of an air-permeable hydrophobic fiber material.

47 Claims, 1 Drawing Sheet

U.S. PATENT DOCUMENTS 4,253,317 A * 3/1981 Howard et al. ..... 66/186
4,255,949 A * 3/1981 Thorneburg ..... 66/185
4,571,960 A * 2/1986 Hursh et al. ..... 66/196
4,631,755 A * 12/1986 Zingg et al. ..... 2/239
4,733,412 A * 3/1988 Campbell ..... 2/161.1
4,831,667 A * 5/1989 Town ..... 2/163
4,843,844 A * 7/1989 Hursh et al. ..... 66/196
4,858,245 A * 8/1989 Sullivan et al. ..... 2/21
4,898,007 A * 2/1990 Dahlgren ..... 66/185
4,958,507 A * 9/1990 Allaire et al. ..... 66/19
5,095,548 A * 3/1992 Chesebro, Jr. ..... 2/239
5,138,718 A * 8/1992 Willard ..... 2/159
5,167,038 A * 12/1992 Rinehart ..... 2/164
5,319,807 A * 6/1994 Brier ..... 2/239
5,335,517 A * 8/1994 Throneburg et al. ..... 66/185
5,353,524 A * 10/1994 Brier ..... 36/55
5,555,565 A * 9/1996 Gallagher, Jr. ..... 2/239
5,590,421 A * 1/1997 Craner ..... 2/161.7
5,603,232 A * 2/1997 Throneburg ..... 66/185
5,615,418 A * 4/1997 Pruit ..... 2/239
5,617,745 A * 4/1997 Della Corte et al. ..... 66/178 A
5,636,381 A * 6/1997 Brogden ..... 2/161.1
5,675,992 A * 10/1997 Wrightenberry ..... 66/178 R
5,771,495 A * 6/1998 Turner et al. ..... 2/239
5,774,898 A * 7/1998 Malpee ..... 2/239
5,784,721 A * 7/1998 Huff ..... 2/239
5,815,839 A * 10/1998 Safford ..... 2/161.1
5,829,057 A * 11/1998 Gunn ..... 2/69
5,983,402 A * 11/1999 Fincher ..... 2/239
6,000,247 A * 12/1999 Takeda et al. ..... 66/187
6,012,177 A * 1/2000 Cortinovis ..... 2/239
6,016,575 A * 1/2000 Prychak ..... 2/239
6,021,527 A * 2/2000 Lessard ..... 2/239
6,032,295 A * 3/2000 Marshall ..... 2/239
6,082,146 A * 7/2000 Dahlgren ..... 66/185
6,092,397 A * 7/2000 Cortinovis ..... 66/184
6,108,820 A * 8/2000 Bernhardt ..... 2/239
6,139,929 A * 10/2000 Hayton et al. ..... 428/35.2
6,158,253 A * 12/2000 Svoboda et al. ..... 66/178 R
6,279,165 B1 * 8/2001 Kobayashi ..... 2/163
6,286,151 B1 * 9/2001 Lambertz ..... 2/239
6,298,491 B1 * 10/2001 Blustin et al. ..... 2/163
6,308,337 B1 * 10/2001 Penley ..... 2/239
6,324,874 B2 * 12/2001 Fujimoto ..... 66/185
6,334,222 B1 * 1/2002 Sun ..... 2/239
6,341,505 B1 * 1/2002 Dahlgren ..... 66/185
6,367,087 B1 * 4/2002 Spillman et al. ..... 2/239
6,381,753 B1 * 5/2002 Smith et al. ..... 2/167
6,381,755 B2 * 5/2002 Cortani ..... 2/239
6,393,734 B1 * 5/2002 Ou ..... 36/97
D480,554 S * 10/2003 Roddy et al. ..... D2/989
6,708,348 B1 * 3/2004 Romay ..... 2/239
7,069,600 B1 * 7/2006 Romay ..... 2/239
7,082,703 B2 * 8/2006 Greene et al. ..... 36/89
7,346,935 B1 * 3/2008 Patterson ..... 2/239
2001/0027665 A1 * 10/2001 Fujimoto ..... 66/185
2001/0032349 A1 * 10/2001 Cortani ..... 2/239
2003/0074718 A1 * 4/2003 English ..... 2/239
2003/0145491 A1 * 8/2003 Udugama ..... 36/23

* cited by examiner

TOE SOCK

Matter enclosed in heavy brackets [ ] appears in the original patent but forms no part of this reissue specification; matter printed in italics indicates the additions made by reissue.

CROSS-REFERENCE TO RELATED APPLICATIONS

This patent application is a continuation of U.S. patent application Ser. No. 10/158,780, filed May 29, 2002 now U.S. Pat. No. 6,708,348, entitled ANATOMIC DRY ATHLETIC TOE SOCK, which is a continuation of U.S. patent application Ser. No. 09/863,153, filed May 22, 2001 now abandoned, entitled ANATOMIC DRY ATHLETIC TOE SOCK, both of which are hereby fully incorporated herein by reference in their entirety.

*This reissue application is related to prior reissue application Ser. No. 12/167,336 filed on Mar. 9, 2009 (abandoned).*

BACKGROUND OF THE INVENTION

1. Field of the Invention

The present invention relates, in general, to athletic socks, and, in particular, to athletic toe socks.

2. Discussion of the Related Art

Toe socks have been around since at least the 1960s. A toe sock is worn like a regular sock, except the sock includes multiple toe sections to accommodate the wearer's toes, similar to the way the finger sections of a glove accommodate a wearer's fingers. Toe socks of the past were made more for novelty purposes than for true athletic use. Problems with prior toe socks include that the sock material was made of an uncomfortable acrylic material or the sock material was made of materials such as cotton/poly blends and poly blends that absorb moisture, making them inadequate for athletic use. Additional problems include that the stitching between toe sections was bulky and uncomfortable, the socks had a generic shape, the socks were baggy, and the socks were not anatomically shaped or form fitting. The poor fit of these socks caused the socks to move around on the wearer's foot during use, increasing the probability of blisters or other foot irritation caused by rubbing.

SUMMARY OF THE INVENTION

Accordingly, the inventors of the present invention recognized a need for an anatomic dry athletic toe sock that functions like a second skin for the wearer's foot and eliminates one or more of these problems with prior toe socks.

An aspect of the invention involves an anatomic dry athletic toe sock shaped to fit either a right foot or a left foot of a wearer. The anatomic dry athletic toe sock includes a sock shaft section including an open end through which the foot of the wearer is inserted when the sock is put on. The sock shaft section includes a shaft support section to encircle a lower part of a leg of a wearer and maintain the sock in proper orientation upon the leg. A closed foot section is adapted to receive the foot of the wearer and includes a heel section adapted to receive a heel of the wearer therein, an arch section having an arch support section to encircle the foot of the wearer in the arch of the wearer's foot and prevent the arch section of the sock from moving relative to the wearer's foot, and a plurality of separated, closed toe sections to receive toes of the foot of the wearer. The toe sections are joined by nested, overlapping material portions. The sock is also made at least partially of an air-permeable hydrophobic fiber material.

Another aspect of the invention involves an anatomic dry athletic toe sock shaped to fit either a right foot or a left foot of a wearer. The anatomic dry athletic toe sock includes a sock shaft section including an open end through which the foot of the wearer is inserted when the sock is put on. The sock shaft section is adapted to encircle a lower part of a leg of a wearer and includes a shaft support section to maintain the sock in proper orientation upon a wearer's leg. A closed foot section is adapted to receive the foot of the wearer. The foot section includes a heel section adapted to receive a heel of the wearer therein, an arch section having an arch support section to encircle the foot of the wearer in the arch of the wearer's foot and to prevent the arch section of the sock from moving relative to the wearer's foot, and a plurality of separated, closed toe sections to receive toes of the foot of the wearer.

An additional aspect of the invention involves an anatomic dry athletic toe sock shaped to fit either a right foot or a left foot of a wearer. The anatomic dry athletic toe sock includes a sock shaft section including an open end through which the foot of the wearer is inserted when the sock is put on and is adapted to encircle a lower part of a leg of a wearer. A closed foot section is adapted to receive the foot of the wearer. The closed foot section includes a heel section adapted to receive a heel of the wearer therein, an arch section, and a plurality of separated, closed toe sections to receive toes of the foot of the wearer. The sock is also made at least partially of an air-permeable hydrophobic fiber material and includes an interior portion and an exterior portion. The interior portion includes a greater amount of hydrophobic fiber material than the exterior portion, the hydrophobic fiber material serving to wick away perspiration from the user's body and allow air therethrough.

A further aspect of the invention involves an anatomic dry athletic toe sock shaped to fit either a right foot or a left foot of a wearer. The anatomic dry athletic toe sock includes a sock shaft section including an open end through which the foot of the wearer is inserted when the sock is put on and is adapted to encircle a lower part of a leg of a wearer. A closed foot section is adapted to receive the foot of the wearer. The closed foot section includes a heel section adapted to receive a heel of the wearer therein, an arch section, and a plurality of separated, closed toe sections to receive toes of the foot of the wearer. The toe sections are joined by nested, overlapping material portions.

A still further aspect of the invention involves an anatomic dry athletic toe sock shaped to fit either a right foot or a left foot of a wearer. The anatomic dry athletic toe sock includes a sock shaft section including an open end through which the foot of the wearer is inserted when the sock is put on and is adapted to encircle a lower part of a leg of a wearer. A closed foot section is adapted to receive the foot of the wearer. The closed foot section includes a heel section adapted to receive a heel of the wearer therein, an arch section having a circumferential ribbed elastomeric band adapted to encircle the foot of the wearer in the arch of the wearer's foot and for preventing the arch section of the sock from moving relative to the wearer's foot, and a plurality of separated, closed toe sections to receive toes of the foot of the wearer.

Another aspect of the invention involves a sock comprising a heel section adapted to receive a heel of a foot of a wearer therein, an arch section, and a plurality of separated, closed toe sections to receive toes of the foot of the wearer. The toe sections are joined by nested, overlapping material portions.

Another aspect of the invention involves a method of making a sock. The method comprises the steps of: forming a heel section adapted to receive a heel of a foot of a wearer therein; forming an arch section; and forming a plurality of separated, closed toe sections to receive toes of the foot of the wearer, the toe sections joined by nested, overlapping material portions.

Another aspect of the invention involves a method for use in making a sock. The method comprises the steps of: knitting a first toe section; and knitting a next larger toe section to partially overlap the first toe section.

Another aspect of the invention involves a sock. The sock comprises a sock shaft section including an open end through which a foot of a wearer is inserted when the sock is put on, and a closed foot section adapted to receive the foot of the wearer. The closed foot section includes a heel section adapted to receive a heel of the wearer therein, an arch section, and a plurality of separated, closed toe sections to receive toes of the foot of the wearer, the toe sections joined by nested, overlapping material portions. The sock is made at least partially of a air-permeable, hydrophobic fiber material.

Another aspect of the invention involves a sock. The sock comprises a sock shaft section including an open end through which a foot of a wearer is inserted when the sock is put on, and a closed foot section adapted to receive the foot of the wearer. The closed foot section includes a heel section adapted to receive a heel of the wearer therein, an arch section, and a plurality of separated, closed toe sections to receive toes of the foot of the wearer, the toe sections joined by nested, overlapping material portions.

These and further objects and advantages will be apparent to those skilled in the art in connection with the drawing and the detailed description of the preferred embodiment set forth below.

DETAILED DESCRIPTION OF THE PREFERRED EMBODIMENT

Figure 1:
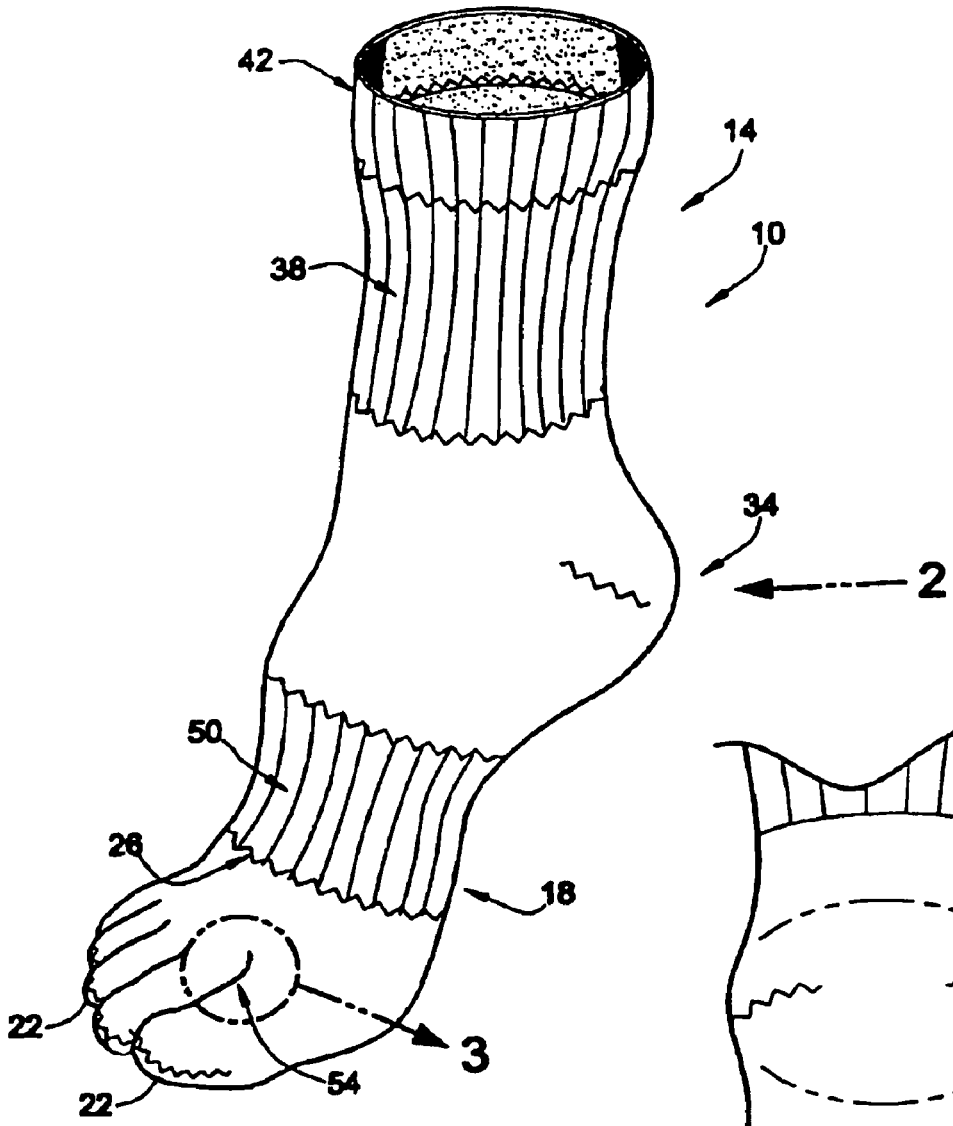
FIG. 1 is a perspective view of an embodiment of an anatomic dry athletic toe sock.
Figure 2:
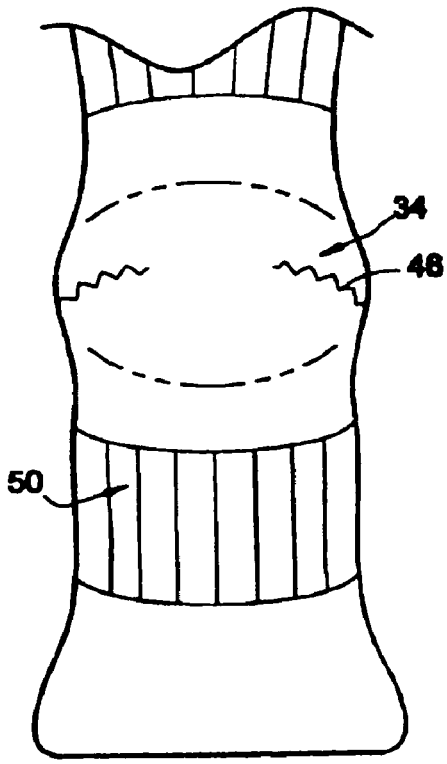
FIG. 2 is a rear elevational view of the anatomic dry athletic toe sock illustrated in FIG. 1.
Figure 3:
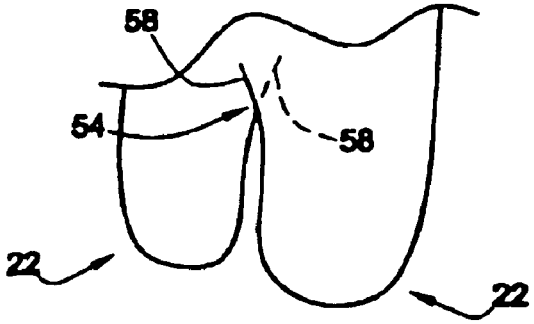
FIG. 3 is an enlarged view of the area 3-3 of the sock illustrated in FIG. 1.

With reference to FIGS. 1-3, an embodiment of an anatomic dry athletic toe sock 10 will now be described.

The sock 10 is preferably made of an air permeable, hydrophobic, tetra-channel, wicking polyester fiber material such as Coolmax® sold by Dupont. Other hydrophobic wicking fibers may be used. For example, but not by way of limitation, a hollow-core, hydrophobic wicking fiber sold as Thermolite™ by Dupont may be used. This fiber material wicks away moisture and traps warm air in its hollow-core fibers. Also, a Teflon® or polytetrafluoroethylene fiber material may be used. This fiber material may be used to wick away moisture and reduce friction against the skin.

Preferably, an interior portion of the sock 10 has a greater or equal concentration of the hydrophobic fibers than an exterior portion of the sock 10, helping to pull moisture away from the skin to the exterior of the sock 10 where it will evaporate.

Prior toe socks have been made of absorbent materials such as cotton and other hydrophilic materials. A problem with these materials is that they attract perspiration from the foot instead of wicking the moisture away from the foot. When the foot produces excessive amounts of perspiration or sweat, especially during athletic activity, the body is using energy to try and keep cool. This is energy the body could be using to perform. If the perspiration doesn't evaporate quickly, the body core temperature heats up, producing more sweat.

Hydrophobic fibers such as those used in the CoolMax® fabric transport perspiration away from the skin to the outer layer of the sock 10, where the large surface area of the tetra-channel fibers allow the moisture to evaporate quickly. Simultaneously, the fiber material provides great breathability or air permeability, even when wet. The breathability further enhances the thermoregulatory effect. The user's foot stays drier and more comfortable. The above-described fiber arrangement minimizes friction between the foot and the sock. Friction between the foot and the sock can cause blisters.

The sock preferably includes a resistant nylon exterior portion. The resistant nylon exterior portion may include spandex or similar stretchy material. Nylon is used in a weaving relationship with spandex fiber to add durability. Both the nylon and spandex are synthetic and wick away moisture, but less than hydrophobic fibers discussed above (e.g., Coolmax®, Thermolite™). In combination, nylon and spandex fibers keep the sock 10 adhered to the contours of the wearer's foot, reducing movement of the sock relative to the foot and chaffing, and draw moisture to the surface of the sock because the tighter the fiber adheres to the foot, the better moisture is pulled to the outside of the sock.

Thus, the interior portion of the sock 10 preferably has a greater concentration of hydrophobic fiber material such as Coolmax® and the exterior portion has a higher concentration of nylon and spandex fiber material. In a preferred embodiment, the fabric content is 70% Coolmax®, 25% Nylon, and 5% Spande-flex™, although this may vary in alternative embodiments.

Preferably, each sock 10 of a pair of socks is anatomically designed for either a wearer's left foot or right foot. In an alternative embodiment, a sock may be used for either foot. The socks 10 preferably come in different sizes, e.g., XS, S, M, L, XL and may have different configurations for different sock applications, e.g., running, hiking, etc.

The sock 10 includes a shaft section 14 and a foot section 18. The foot section 18 includes multiple toe sections 22, an arch section 26, and a heel section 34.

The shaft section 14 is tubular and may vary in length and/or construction in accordance with the application of the sock 10. For example, but not by way of limitation, if the sock 10 is a running sock, the shaft section 14 may be relatively short so that it extends just above the ankle and may include very narrow, tightly packed vertical ribs. If the sock 10 is a hiking sock, all-terrain sock or other general-purpose athletic sock, the shaft section 14 may be relatively longer, extending to slightly below the calf region or to the calf region. If the sock 10 is a soccer sock, basketball sock, baseball sock, hockey sock, etc., the shaft section 14 may extend to above the calf region. General athletic socks, basketball socks, soccer socks, and the like may have ribbed sections that are relatively wide and spaced farther apart than the ribs in running socks.

A substantial portion of the shaft section 14 preferably includes a ribbed (preferably vertically ribbed) shaft support section 38 that elastically fits firmly around the wearer's leg without restricting circulation. The shaft support section 38 is preferably made of a spandex and nylon fiber material and has a higher elastomeric to hydrophobic fiber ratio than most or all of the other sections of the sock 10. The higher elastomeric ratio creates an anti-slip, elastic section that is durable and increases the sock's ability to stay up on a lower part of the wearer's leg without rotating or slipping and causing blisters. This creates a snug fit around a lower part of the wearer's leg which, in turn, offers more support. This feature promotes improved blood circulation in the foot. The anti-slip nature of the shaft support section 38 does not restrict movement in the wearer's lower leg. The higher elastomeric ratio adheres the fabric to the skin of the wearer's leg. Tighter adhesion to the skin increases the sock's ability to wick moisture away from the skin. The ribs in this section 38 increase breathability and wicking action. Alternating ribs and channels of different hydrophobic fiber density allow air to easily flow into channels with a lower hydrophobic fiber density to dry the skin and push moisture into channels with a higher hydrophobic fiber density, which transports the moisture to the outer surface of the sock 10, away from the skin, for keeping the skin dry.

Although the shaft support section 38 is described as having ribs, this section 38 may have alternative high density/low density hydrophobic fiber configurations or patterns, e.g., mesh patterns, diamond patterns, cross-stitch patterns, checker patterns, waffle patterns.

At a top portion of the section 38, the shaft 10 includes a dual-welt band or reinforced top 42 to prevent slipping, chaffing, and the like. In the dual-welt band 42, the section 38 is double-layered or doubled over, and stitched together. The extra elastomeric spandex/nylon layer creates more durability and ability for the sock to stay up on the wearer's leg and provides an anti-slip band that prevents sock movement and chaffing.

With reference specifically to FIG. 2, the heel section 34 may have a generally bilaterally symmetric trapezoidal shape with opposite angled stitched seams 46 on both sides of the heel 34. This construction provides an anatomic, accurately sized, antislipping, good form fit to the natural shape of the wearer's heel, preventing the heel 34 of the sock from bunching up, slipping out of place, stretching, or rotating, preventing chaffing and blistering. The anatomic construction of the heel 34 also prevents the wearer from putting the sock over his or her foot with the heel of the sock 10 out of place. The elastomeric spandex and nylon fibers used in the heel section 34 hold the fabric tight to the skin of the heel, increasing the ability of the hydrophobic material in the sock to wick moisture away from the skin. In alternative embodiments, the heel section 34 may have alternative high density/low density hydrophobic fiber configurations or patterns, e.g., mesh patterns, diamond patterns, cross-stitch patterns, checker patterns, waffle patterns. In alternative embodiments, the heel 34 may have a different configuration.

With reference to FIGS. 1 and 2, the foot section 18 is preferably made of the sock material described initially above with high density/low density hydrophobic fiber configurations or patterns, e.g., mesh patterns, diamond patterns, cross-stitch patterns, checker patterns, waffle patterns, weaved or otherwise provided therein.

An arch support section 50, which preferably has a material construction similar to the shaft support section 38 described above with respect to the shaft 14, may encircle a portion of the arch of a wearer's foot. The arch support section 50 is preferably vertically or horizontally ribbed and elastically fits firmly around a portion of the wearer's foot without restricting circulation. The section 50 has a higher elastomeric nylon/spandex to hydrophobic fiber ratio than most or all of the other sections of the sock 10. The higher elastomeric ratio creates an anti-slip, elastic section that is durable and increases the sock's ability to stay in position on the wearer's foot without rotating or slipping, preventing blisters. This creates a snug fit around the foot which, in turn, offers more support. This feature promotes improved blood circulation in the foot. The antislip nature of this section 50 does not restrict movement in the wearer's foot. The higher elastomeric ratio adheres the fabric to the skin of the wearer's foot. Tighter adhesion to the skin increases the sock's ability to wick moisture away from the skin. The ribs in this section 50 increase breathability and wicking action. Alternating rib channels of different hydrophobic fiber density allow air to easily flow into channels with lower hydrophobic fiber density to dry the skin and push moisture into channels with higher hydrophobic fiber density, which transports the moisture to the outer surface of the sock 10, away from the skin, for keeping the skin dry.

Although this section 50 is described as having ribs, this section 50 may have alternative high density/low density hydrophobic fiber configurations or patterns, e.g., mesh patterns, diamond patterns, cross-stitch patterns, checker patterns, waffle patterns.

With reference to FIGS. 1 and 3, the sock 10 preferably includes five toe sections 22. In alternative embodiments, the sock 10 may have alternative numbers of toe sections, e.g., 2, 3, 4. The toe sections 22 are separated by trough regions 54. Toe socks in the past had uncomfortable trough regions. Because toe socks have not been that common, most wearers are more familiar with their toes being in skin-to-skin contact, in a tight or snug relationship with each other. In the past, adjacent trough sections formed a V or angle that intersected at an apex. At the apex, the adjacent trough sections were stitched together to join the toe sections. This stitched apex created an uncomfortable lumpy feeling between the wearer's toes. In contrast, the trough regions 54, which each have an apex located where adjacent toe sections 22 are joined, include nested, overlapping material portions 58 where the toe sections 22 intersect. The nested, overlapping material portions 58 eliminate the uncomfortable lumpy feeling between the toes common to toe socks of the past. Keeping the toes separate prevents the toes from rubbing. This improves circulation in the foot, relieves stress, and protects the toe from moisture and blistering. The hydrophobic and permeable material used in the sock 10 further protects the toes from moisture and blistering by wicking away perspiration from the toes to the surface of the sock and promoting breathability in this area of the sock 10. Another benefit of the toe construction is that it is seamless across the top and bottom. Athletic socks in the past generally include a seam running across the top or bottom of the sock, along the toe of the sock. This seam protrudes, is uncomfortable, inhibits circulation in the wearer's foot, and causes blisters. The toe sections 22 of the sock 10 are stitched and closed with the nested, overlapping material portions 58 so that the slight seams that do exist at the toe sections 22 are unnoticeable to the toes when in the toe sections 22 and do not cause irritating pressure points on the toes where a seam would normally be, increasing comfort and reducing friction and blistering.

An exemplary method of manufacturing the sock 10 will now be generally described. The sock 10 may be knitted into two halves, a top half and a bottom half, of a desired weave pattern. Each half is uniformly knit with the exception of the shaft support section 38 and the arch support section 50. These two sections 38, 50 may be knit in uniformity to each other. To create the heel 34, the bottom half is knit longer than the top half in the heel section. The heel section of the bottom half includes a pair of oppositely oriented, symmetric V-shaped cut-outs. The angled portions of the cut-outs are stitched together to form the opposite angled seams 46. This causes the heel 34 to have the generally bilaterally symmetric trapezoidal shape. The toe sections 22 are knit to have overlapping material portions 58. This may be done by first knitting the smallest toe section 22 followed by consecutively knitting the next larger toe section 22 to partially overlap the smaller toe before it. Preferably as the halves are knit, the halves are simultaneously joined together along their edges. The ends of the toe sections 22 are joined along their periphery. The sock 10 may be manufactured by a single machine with multiple sub-machine components, or multiple machines. Further, the steps described above may be performed simultaneously, consecutively, or a combination of the two.

The material construction of the sock 10, as well as other aspects of the sock 10 described above, make the sock 10 like an additional layer of skin for the wearer's foot. The sock is thin, lightweight, breathable, and moldable to every contour of a wearer's foot. The anatomic design of the sock 10 makes it relatively snug on the wearer's foot, but does not restrict movement, preventing blisters and chaffing. The anatomic design of the sock 10 and snugness imparted by the sock 10 causes more surface area of the sock 10 to firmly touch the skin, including the toe area, wicking more moisture from the skin and keeping the wearer's foot drier than toe socks of the prior art.

Although the anatomic, dry toe sock 10 has been described as an athletic sock, in an alternative embodiment, the sock 10 may be a dress sock or other type of sock. Further, in one or more alternative embodiments, the sock 10 may include one or more of the aspects described above (e.g., sock 10 made of an air permeable, hydrophobic, wicking tetra-channel or hollow-core fiber material, greater amount of hydrophobic material on interior portion of sock, one or more sections of the sock 10 include high density/low density hydrophobic fiber configurations or patterns, shaft section includes a shaft support section, shaft section includes dual-welt band, foot portion includes arch support section, toe sections separated by nested, overlapping material portions). The general material construction of the sock 10 and/or one or more sections of the sock may have a configuration or pattern such as, but not limited to, a rib pattern (e.g., vertical, horizontal), a mesh pattern, a diamond pattern, a cross-stitch pattern, a checker pattern, and a waffle pattern. Further, the sock 10 may have one or more thicker areas for certain sock applications, e.g., a snowboarding sock, a specialized running sock. For example, if the sock 10 was a snowboarding sock, the sock 10 may have thicker area in a front part of the shaft section 14 to pad the wearer's shin from the boot and a thicker area on top of a front portion of the sock 10 to pad the top of the wearer's foot from the boot. If the sock 10 was a specialized running sock, the sock 10 may have a thicker area on ball of foot and/or heel to pad the foot of the runner. The thicker ball area and/or foot area may be anatomical to left and right feet.

It will be readily apparent to those skilled in the art that still further changes and modifications in the actual concepts described herein can readily be made without departing from the spirit and scope of the invention as defined by the following claims.

What is claimed is:

1. An anatomic dry athletic toe sock shaped to fit either a right foot or a left foot of a wearer, said anatomic dry athletic toe sock comprising:

a sock shaft section including an open end through which the foot of the wearer is inserted when the sock is put on, the sock shaft section including a shaft support section to encircle a lower part of a leg of a wearer and to maintain the sock in proper orientation upon the leg;

a closed foot section adapted to receive the foot of the wearer, the closed foot section including a heel section adapted to receive a heel of the wearer therein, an arch section having an arch support section to encircle the foot of the wearer in an arch of the wearer's foot and to prevent the arch section of the sock from moving relative to the wearer's foot, a plurality of separated, closed toe sections to receive toes of the foot of the wearer, the toe sections being separated by trough regions that keep the toes separate to prevent the toes from rubbing and that each have an apex located where adjacent toe sections are joined, the toe sections joined by nested, overlapping material portions at the apex of each trough region, wherein said sock is made at least partially of an air-permeable, hydrophobic, wicking fiber material.

2. The sock of claim 1, wherein the sock includes an interior portion and an exterior portion, the interior portion including a greater or equal amount of hydrophobic fiber material than the exterior portion, the hydrophobic fiber material serving to wick away perspiration from the user's body and allow air therethrough.

3. The sock of claim 1, where the sock includes one or more sections with multiple adjacent high density and low density hydrophobic fiber material areas.

4. The sock of claim 1, where the hydrophobic fiber material is channeled.

5. The sock of claim 1, where the hydrophobic fiber material has at least one of a tetra-channeled and hollow-core configuration.

6. The sock of claim 1, wherein the shaft support section includes multiple adjacent high density and low density hydrophobic fiber material areas.

7. The sock of claim 1, wherein the sock includes a dual-welt band.

8. The sock of claim 1, wherein the heel section is configured to provide an anatomic, accurately sized, anti-slipping, good form fit to a natural shape of a wearer's heel, preventing the heel section from bunching up or slipping out of place.

9. The sock of claim 1, wherein the heel section has a generally bilaterally symmetric trapezoidal shape.

10. The sock of claim 9, wherein the heel section has sides with opposite angled stitched seams.

11. The sock of claim 1, wherein each toe section includes a top portion above the toe and a bottom portion below the toe that are seamless.

[12. A sock comprising:

a heel section adapted to receive a heel of a foot of a wearer therein;

an arch section; and a plurality of separated, closed toe sections to receive toes of the foot of the wearer, the toe sections being separated by trough regions that keep the toes separate to prevent the toes from rubbing and that each have an apex located where adjacent toe sections are joined, the toe sections joined by nested, overlapping material portions at the apex of each trough region.]

13. A sock in accordance with claim [12] *24*, wherein the sock is made at least partially of an air-permeable, hydrophobic fiber material.

14. A sock in accordance with claim 13, wherein the sock includes an interior portion and an exterior portion, the interior portion including a greater or equal amount of hydrophobic fiber material than the exterior portion.

15. A sock in accordance with claim 13, wherein the sock includes one or more sections with multiple adjacent high density and low density hydrophobic fiber material areas.

16. A sock in accordance with claim 13, wherein the hydrophobic fiber material comprises channels.

17. A sock in accordance with claim 13, wherein the hydrophobic fiber material has at least one of a tetra-channeled and hollow-core configuration.

18. A sock in accordance with claim [12] *24*, wherein the heel section has a generally bilaterally symmetric trapezoidal shape.

19. A sock in accordance with claim [12] *24*, wherein the heel section has sides with opposite angled stitched seams.

20. A sock in accordance with claim [12] *24*, wherein the arch support section includes multiple adjacent high density and low density hydrophobic fiber material areas.

21. A sock in accordance with claim [12] *24*, wherein each toe section includes a top portion above the toe and a bottom portion below the toe that are seamless.

[22. A sock in accordance with claim 12, further comprising:

a sock shaft section including an open end through which the foot of the wearer is inserted when the sock is put on and adapted to encircle a lower part of a leg of a wearer.]

23. A sock in accordance with claim [22] *24*, wherein the shaft support section includes multiple adjacent high density and low density hydrophobic fiber material areas.

24. [A sock in accordance with claim 22, wherein] *A sock comprising: a heel section adapted to receive a heel of a foot of a wearer therein; an arch section; and a plurality of separated, closed toe sections to receive toes of the foot of the wearer, the toe sections being separated by trough regions that keep the toes separate to prevent the toes from rubbing and that each have an apex located where adjacent toe sections are joined, the toe sections joined by nested, overlapping material portions at the apex of each trough region; a sock shaft section including an open end through which the foot of a wearer is inserted when the sock is put on and adapted to encircle a lower part of the leg of a wearer,* the sock [includes] *including* a dual-welt band.

[25. A method of making a sock, comprising the steps of:

forming a heel section adapted to receive a heel of a foot of a wearer therein;

forming an arch section; and forming a plurality of separated, closed toe sections to receive toes of the foot of the wearer, the toe sections being separated by trough regions that keep the toes separate to prevent the toes from rubbing and that each have an apex located where adjacent toe sections are joined, the toe sections joined by nested, overlapping material portions at the apex of each trough region.]

26. A method in accordance with claim [25] *37*, wherein the sock is made at least partially of an air-permeable, hydrophobic fiber material.

27. A method in accordance with claim 26, wherein the sock includes an interior portion and an exterior portion, the interior portion including a greater or equal amount of hydrophobic fiber material than the exterior portion.

28. A method in accordance with claim 26, wherein the sock includes one or more sections with multiple adjacent high density and low density hydrophobic fiber material areas.

29. A method in accordance with claim 26, wherein the hydrophobic fiber material comprises channels.

30. A method in accordance with claim 26, wherein the hydrophobic fiber material has at least one of a tetra-channeled and hollow-core configuration.

31. A method in accordance with claim [25] *37*, wherein the heel section has a generally bilaterally symmetric trapezoidal shape.

32. A method in accordance with claim 26, wherein the heel section has sides with opposite angled stitched seams.

33. A method in accordance with claim [25] *37*, wherein the arch support section includes multiple adjacent high density and low density hydrophobic fiber material areas.

34. A method in accordance with claim [25] *37*, wherein each toe section includes a top portion above the toe and a bottom portion below the toe that are seamless.

[35. A method in accordance with claim 25, further comprising the step of:

forming a sock shaft section including an open end through which the foot of the wearer is inserted when the sock is put on and adapted to encircle a lower part of a leg of a wearer.]

36. A method in accordance with claim [35] *37*, wherein the shaft support section includes multiple adjacent high density and low density hydrophobic fiber material areas.

37. [A method in accordance with claim 35, further comprising the step of:] *A method of making a sock, comprising the steps of: forming a heel section adapted to receive a heel of a foot of a wearer therein; forming an arch section; forming a plurality of separated, closed toe sections to receive toes of the foot of the wearer, the toe sections being separated by trough regions that keep the toes separate to prevent the toes from rubbing and that each have an apex located where adjacent toe sections are joined, the toe sections joined by nested, overlapping material portions at the apex of each trough region, forming a sock shaft section including an open end through which the foot of the wearer is inserted when the sock is put on and adapted to encircle a lower part of a leg of a wearer, and* forming a dual-welt band on the sock.

[38. A sock comprising:

a sock shaft section including an open end through which a foot of a wearer is inserted when the sock is put on; and a closed foot section adapted to receive the foot of the wearer, the closed foot section including a heel section adapted to receive a heel of the wearer therein, an arch section, a plurality of separated, closed toe sections to receive toes of the foot of the wearer, the toe sections being separated by trough regions that keep the toes separate to prevent the toes from rubbing and that each have an apex located where adjacent toe sections are joined, the toe sections joined by nested, overlapping material portions at the apex of each trough region, wherein said sock is made at least partially of a air-permeable, hydrophobic fiber material.]

[39. A sock in accordance with claim 38, wherein the sock includes an interior portion and an exterior portion, the interior portion including a greater or equal amount of hydrophobic fiber material than the exterior portion.]

40. A sock comprising:

a sock shaft section including an open end through which a foot of a wearer is inserted when the sock is put on; and a closed foot section adapted to receive the foot of the wearer, the closed foot section including a heel section adapted to receive a heel of the wearer therein, an arch section, a plurality of separated, closed toe sections to receive toes of the foot of the wearer, the toe sections being separated by trough regions that keep the toes separate to prevent the toes from rubbing and that each have an apex located where adjacent toe sections are joined, the toe sections joined by nested, overlapping material portions at the apex of each trough region, *the sock including a dual-welt band.*

41. A sock in accordance with claim 10, wherein each toe section includes a top portion above the toe and a bottom portion below the toe that are seamless.

*42. A toe sock, the toe sock comprising:*

*(a) a sock shaft section adapted to encircle a lower part of a leg of a wearer, the shaft section including an open end through which a foot of a wearer is inserted;*

*(b) a closed foot section adapted to receive the foot of a wearer, the closed foot section including a heel section and an arch section;*

*(c) a plurality of separated, closed toe sections configured to receive the toes of the foot of the wearer, the toe sections being separated by trough regions that keep the toes separate to prevent the toes from rubbing and being joined by nested, overlapping material portions at an apex of each trough region, wherein the apex is positioned where adjacent toe sections are joined; and*

*(d) the sock includes a dual-welt band.*

*43. The toe sock in accordance with claim 42, wherein the toe sock is an anatomic toe sock shaped to fit either a right foot or a left foot of a wearer.*

*44. The toe sock in accordance with claim 42, wherein the toe sock is a dry sock at least partially comprising an air-permeable, hydrophobic material.*

*45. A toe sock, the toe sock comprising:*

*(a) a sock shaft section adapted to encircle a lower part of a leg of a wearer, the shaft section including an open end through which a foot of a wearer is inserted;*

*(b) a closed foot section adapted to receive the foot of a wearer;*

*(c) a plurality of separated, closed toe sections configured to receive the toes of the foot of the wearer, the toe sections being separated by trough regions that keep the toes separate to prevent the toes from rubbing and being joined by nested, overlapping material portions at an apex of each trough region, wherein the apex is positioned where adjacent toe sections are joined;*

*(d) the sock includes a dual-welt band; and*

*(e) the toe sock comprising a dry sock at least partially comprising an air-permeable, hydrophobic, wicking fiber material.*

*46. The toe sock in accordance with claim 42, wherein the toe sock is an athletic sock.*

*47. The toe sock in accordance with claim 42, wherein the sock shaft section is adapted so as to maintain the sock in proper orientation upon the leg.*

*48. The toe sock in accordance with claim 42, wherein the arch section encircles a foot of the wearer.*

*49. The toe sock in accordance with claim 48, wherein the arch section is configured for preventing the arch section from moving relative to the wearer's foot.*

*50. An anatomical toe sock, the toe sock comprising:*

*(a) a sock shaft section including an open end through which the foot of a wearer is inserted when the sock is put on and adapted to encircle a lower part of the leg of a wearer;*

*(b) a closed foot section adapted to receive the foot of the wearer and including a heel section adapted to receive a heel of a foot of a wearer therein and an arch section;*

*(c) a plurality of separated, closed toe sections configured to receive toes of the foot of the wearer, the toe sections being separated by trough regions that keep the toes separate from one another to prevent the toes from rubbing, wherein the toe sock is adapted to fit either the right or the left foot of a wearer; and*

*(d) the sock including a dual-welt band.*

*51. The toe sock in accordance with claim 50, wherein the toe sock is a dry sock at least partially comprising an air-permeable, hydrophobic material.*

*52. The toe sock in accordance with claim 51, wherein the hydrophobic material additionally comprises a wicking fiber material.*

*53. An anatomic dry athletic toe sock shaped to fit either a right foot or a left foot of a wearer, said anatomic dry athletic toe sock comprising: a sock shaft section including an open end through which the foot of the wearer is inserted when the sock is put on, the sock shaft section including a shaft support section to encircle a lower part of a leg of a wearer and to maintain the sock in proper orientation upon the leg; a closed foot section adapted to receive the foot of the wearer, the closed foot section including a heel section, an arch section, and a plurality of separated, closed toe sections to receive toes of the foot of the wearer, the toe sections being separated by trough regions that keep the toes separate to prevent the toes from rubbing and that each have an apex located where adjacent toe sections are joined, the toe sections joined by nested, overlapping material portions at the apex of each trough region, wherein said sock is made at least partially of an air-permeable, hydrophobic, wicking fiber material.*

* * * * *